(12) United States Patent
Miyamoto et al.

(10) Patent No.: US 10,365,183 B2
(45) Date of Patent: Jul. 30, 2019

(54) ABNORMALITY DIAGNOSIS SYSTEM OF AIR-FUEL RATIO SENSOR

(71) Applicant: Toyota Jidosha Kabushiki Kaisha, Aichi (JP)

(72) Inventors: Hiroshi Miyamoto, Shizuoka (JP); Yasushi Iwazaki, Ebina (JP); Keiichiro Aoki, Shizuoka (JP); Toru Kidokoro, Hadano (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 61 days.

(21) Appl. No.: 15/026,099

(22) PCT Filed: Oct. 1, 2013

(86) PCT No.: PCT/JP2013/076719
§ 371 (c)(1),
(2) Date: Mar. 30, 2016

(87) PCT Pub. No.: WO2015/049726
PCT Pub. Date: Apr. 9, 2015

(65) Prior Publication Data
US 2016/0245723 A1    Aug. 25, 2016

(51) Int. Cl.
*G01M 15/10* (2006.01)
*F02D 41/22* (2006.01)
*F02D 41/14* (2006.01)

(52) U.S. Cl.
CPC ....... *G01M 15/104* (2013.01); *F02D 41/1441* (2013.01); *F02D 41/1445* (2013.01);
(Continued)

(58) Field of Classification Search
None
See application file for complete search history.

(56) References Cited

U.S. PATENT DOCUMENTS 4,739,614 A * 4/1988 Katsuno ................ F01N 11/007
123/688
5,781,878 A * 7/1998 Mizoguchi ......... G01N 27/4175
701/109
(Continued)

FOREIGN PATENT DOCUMENTS

JP    04365952 A  * 12/1992
JP    H5-272384 A    10/1993
(Continued)

OTHER PUBLICATIONS

Office Action for U.S. Appl. No. 15/026,015 dated Jan. 18, 2018, 11pp.
(Continued)

*Primary Examiner* — Matthew G Marini
*Assistant Examiner* — Ruben C Parco, Jr.
(74) *Attorney, Agent, or Firm* — Hauptman Ham, LLP

(57) ABSTRACT

The abnormality diagnosis system of an air-fuel ratio sensor comprising an exhaust purification catalyst, an upstream side air-fuel ratio sensor provided at an upstream side of the exhaust purification catalyst, a downstream air-fuel ratio sensor provided at a downstream side of the exhaust purification catalyst, and a diagnosis device diagnosing the downstream air-fuel ratio sensor for abnormality based on outputs of these air-fuel ratio sensors. The diagnosis device judges that the downstream air-fuel ratio sensor suffers from an abnormality if the output air-fuel ratio of the upstream side air-fuel ratio sensor has become a rich air-fuel ratio richer than a stoichiometric air-fuel ratio, and the output air-fuel ratio of the downstream air-fuel ratio sensor air-fuel ratio has changed from an air-fuel ratio richer than a lean judged reference air-fuel ratio to an air-fuel ratio leaner than the lead judged reference air-fuel ratio. As a result, it is possible to accurately diagnose an abnormality of a down- (Continued)

stream air-fuel ratio sensor when using an air-fuel ratio sensor as a downstream side sensor.

17 Claims, 12 Drawing Sheets

(52) U.S. Cl.
CPC ..... *F02D 41/1456* (2013.01); *F02D 41/1495* (2013.01); *F02D 41/1454* (2013.01)

(56) References Cited

U.S. PATENT DOCUMENTS

| | | | |
|---|---|---|---|
| 5,845,489 A | | 12/1998 | Dohta et al. |
| 5,852,228 A | * | 12/1998 | Yamashita ......... F02D 41/1476 73/23.32 |
| 5,927,260 A | * | 7/1999 | Kishimoto ......... F02D 41/1495 123/688 |
| 6,032,659 A | | 3/2000 | Yamashita et al. |
| 6,073,440 A | * | 6/2000 | Douta ................... F01N 11/007 60/276 |
| 6,344,118 B1 | * | 2/2002 | Kobayashi ......... G01N 27/4075 204/421 |
| 6,371,096 B1 | | 4/2002 | Ohsaki et al. |
| 6,877,498 B1 | * | 4/2005 | Matsushima ....... F02D 41/1474 123/672 |
| 2004/0226282 A1 | | 11/2004 | Hattori |
| 2006/0277971 A1 | | 12/2006 | Tashiro et al. |
| 2010/0186491 A1 | | 7/2010 | Shibata et al. |
| 2010/0212414 A1 | | 8/2010 | Nakamura |
| 2012/0174900 A1 | | 7/2012 | Miyamoto et al. |
| 2016/0245723 A1 | | 8/2016 | Miyamoto et al. |

FOREIGN PATENT DOCUMENTS

| | | | | | |
|---|---|---|---|---|---|
| JP | H6-74074 A | | 3/1994 | | |
| JP | 06273371 A | * | 9/1994 | ......... | F02D 41/1441 |
| JP | 2004-019542 A | | 1/2004 | | |
| JP | 2004019542 A | * | 1/2004 | ......... | F02D 41/0295 |
| JP | 2004-225684 A | | 8/2004 | | |
| JP | 2004-308574 A | | 11/2004 | | |
| JP | 2005-133620 A | | 5/2005 | | |
| JP | 2006-125252 A | | 5/2006 | | |
| JP | 2006-343281 A | | 12/2006 | | |
| JP | 2007-032537 A | | 2/2007 | | |
| JP | 2008-274823 A | | 11/2008 | | |
| JP | 2008-292444 A | | 12/2008 | | |
| JP | 2009-156227 A | | 7/2009 | | |
| JP | 2009-209747 A | | 9/2009 | | |
| JP | 2010-025090 A | | 2/2010 | | |
| JP | 2010116857 A | * | 5/2010 | | |
| JP | 2010-159720 A | | 7/2010 | | |
| JP | 2010-196483 A | | 9/2010 | | |
| WO | 2015/049726 A1 | | 4/2015 | | |

OTHER PUBLICATIONS

Corrected Notice of Allowability in U.S. Appl. No. 15/026,015, dated Aug. 9, 2018, 2pp.
Corrected Notice of Allowability in U.S. Appl. No. 15/026,015, dated Jun. 28, 2018, 2pp.
Notice of Allowance in U.S. Appl. No. 15/026,015, dated Jun. 6, 2018, 8pp.
Notice of Allowance in U.S. Appl. No. 15/026,015, dated Mar. 11, 2019, 9pp.

* cited by examiner

ABNORMALITY DIAGNOSIS SYSTEM OF AIR-FUEL RATIO SENSOR

CROSS-REFERENCE TO RELATED APPLICATION

This is a national phase application based on the PCT International Patent Application No. PCT/JP2013/076719 filed Oct. 1, 2013, the entire contents of which are incorporated herein by reference.

TECHNICAL FIELD

The present invention relates to an abnormality diagnosis system of an air-fuel ratio sensor arranged in an exhaust passage of an internal combustion engine.

BACKGROUND ART

Known in the past has been an exhaust purification system providing an air-fuel ratio sensor at an upstream side of an exhaust purification catalyst provided in an exhaust passage of an internal combustion engine in the direction of flow of exhaust and providing an oxygen sensor at a downstream side of the exhaust purification catalyst in the direction of flow of exhaust. In this exhaust purification system, for example, feedback control of the amount of fuel fed to the internal combustion engine is performed based on the output of the upstream side air-fuel ratio sensor so that the air-fuel ratio of the exhaust gas flowing into the exhaust purification catalyst becomes a target air-fuel ratio (main feedback control) and feedback control of the target air-fuel ratio is performed based on the output of the downstream side oxygen sensor (sub feedback control).

In this regard, sometimes an oxygen sensor etc. used in an internal combustion engine suffers from the abnormality of a crack in the element forming the sensor. In such a case, the sensor can no longer produce a suitable output corresponding to the air-fuel ratio of the flowing exhaust gas. Therefore, it is known to provide an abnormality diagnosis system for diagnosing this sensor for abnormality.

As this abnormality diagnosis system, for example, a system which diagnoses abnormality in the following way has been known. That is, when the output air-fuel ratio of the downstream side oxygen sensor has become an air-fuel ratio leaner than a stoichiometric air-fuel ratio (below, referred to as a "lean air-fuel ratio"), the air-fuel ratio of the exhaust gas flowing into the exhaust purification catalyst is made an air-fuel ratio richer than the stoichiometric air-fuel ratio (below, referred to as a "rich air-fuel ratio"). After that, even if the oxygen storage amount of the exhaust purification catalyst becomes zero, if the output air-fuel ratio of the downstream side oxygen sensor does not invert to the rich air-fuel ratio, it is diagnosed that the oxygen sensor suffers from the abnormality of a cracked element etc. (for example, PLT 1). According to PLT 1, due to this, it is considered possible to quickly and precisely detect an abnormality in an oxygen sensor.

CITATION LIST

Patent Literature

PLT 1. Japanese Patent Publication No. 2004-019542A
PLT 2. Japanese Patent Publication No. 2010-196483A
PLT 3. Japanese Patent Publication No. 2010-025090A
PLT 4. Japanese Patent Publication No. 2007-032537A
PLT 5. Japanese Patent Publication No. 2004-308574A

SUMMARY OF INVENTION

Technical Problem

In this regard, PLT 1 is predicated on the use of an oxygen sensor as the downstream side sensor. As a result, even if the oxygen storage amount of the exhaust purification catalyst is zero, when the output air-fuel ratio of the upstream side air-fuel ratio sensor is maintained at the lean air-fuel ratio and the output air-fuel ratio of the oxygen sensor is maintained at the rich air-fuel ratio, it is judged that a cracked element or other abnormality has occurred.

However, when using an air-fuel ratio sensor as the downstream side sensor, a similar technique cannot be used. That is, when using an air-fuel ratio sensor as a downstream side sensor, even if the air-fuel ratio sensor suffers from the abnormality of a cracked element etc., it cannot necessarily be said that the output air-fuel ratio of the air-fuel ratio sensor can be maintained at the lean air-fuel ratio.

Therefore, in consideration of the above problem, an object of the present invention is to provide an abnormality diagnosis system able to accurately diagnose an abnormality of a downstream air-fuel ratio sensor when using an air-fuel ratio sensor as a downstream side sensor.

Solution to Problem

In order to solve the above problem, in a first invention, there is provided an abnormality diagnosis system of an air-fuel ratio sensor comprising an exhaust purification catalyst provided in an exhaust passage of an internal combustion engine, an upstream side air-fuel ratio sensor provided in the exhaust passage at an upstream side of the exhaust purification catalyst in the direction of flow of exhaust, a downstream air-fuel ratio sensor provided in the exhaust passage at a downstream side of the exhaust purification catalyst in the direction of flow of exhaust, and a diagnosis device diagnosing the downstream air-fuel ratio sensor for abnormality based on outputs of these air-fuel ratio sensors, wherein the diagnosis device judges that the downstream air-fuel ratio sensor suffers from an abnormality if the output air-fuel ratio of the upstream side air-fuel ratio sensor has become a rich air-fuel ratio richer than a stoichiometric air-fuel ratio, and the output air-fuel ratio of the downstream air-fuel ratio sensor air-fuel ratio has changed from an air-fuel ratio richer than a lean judged reference air-fuel ratio leaner than the stoichiometric air-fuel ratio to an air-fuel ratio leaner than the lead judged reference air-fuel ratio.

In a second invention, the diagnosis device judges that the downstream air-fuel ratio sensor suffers from an abnormality if the output air-fuel ratio of the upstream side air-fuel ratio sensor changes from a lean air-fuel ratio leaner than the stoichiometric air-fuel ratio to the rich air-fuel ratio and is maintained at the rich air-fuel ratio, and the output air-fuel ratio of the downstream air-fuel ratio sensor has changed from an air-fuel ratio richer than a lean judged reference air-fuel ratio leaner than the stoichiometric air-fuel ratio to an air-fuel ratio leaner than the lead judged reference air-fuel ratio in the first invention.

In a third invention, the system further comprises a flow rate detecting device detecting or estimating a flow rate of exhaust gas flowing around the downstream air-fuel ratio sensor, and the diagnosis device diagnoses abnormality of the downstream air-fuel ratio sensor only when a flow rate detected or estimated by the flow rate detecting device is a predetermined lower limit flow rate or more in the first or second invention.

In a forth invention, the lean judged reference air-fuel ratio is set based on the flow rate of the exhaust gas detected or estimated by the flow rate detecting device in the third invention.

In a fifth invention, the lean judged reference air-fuel ratio is set leaner the greater the flow rate of the exhaust gas detected or estimated by the flow rate detecting device in the fourth invention.

In a sixth invention, the lean judged reference air-fuel ratio is set based on the air-fuel ratio detected by the upstream side air-fuel ratio sensor in any one of the first to fifth inventions.

In a seventh invention, the lean judged reference air-fuel ratio is set leaner the lower the air-fuel ratio detected by the upstream side air-fuel ratio sensor in the sixth invention.

In an eighth invention, the internal combustion engine can perform fuel cut control for stopping or decreasing feed of fuel to a combustion chamber during operation of the internal combustion engine, and the diagnosis device does not diagnose the downstream air-fuel ratio sensor for abnormality when an elapsed time from an end of the fuel cut control is a reference elapsed time or less in any one of the first to seventh inventions.

In a ninth invention, the internal combustion engine can perform fuel cut control for stopping or decreasing feed of fuel to a combustion chamber during operation of the internal combustion engine, and post-reset rich control for making an air-fuel ratio of the exhaust gas flowing into the exhaust purification catalyst a rich air-fuel ratio after an end of the fuel cut control, and the diagnosis device diagnoses the downstream air-fuel ratio sensor for abnormality during execution of the post-reset rich control in any one of the first to eighth inventions.

In a tenth invention, the internal combustion engine can perform normal control alternately changing an air-fuel ratio of the exhaust gas flowing into the exhaust purification catalyst between a rich air-fuel ratio a lean air-fuel ratio leaner than the stoichiometric air-fuel ratio, and active control making the air-fuel ratio of the exhaust gas flowing into the exhaust purification catalyst richer than the rich air-fuel ratio at the time of the normal control, and the diagnosis system diagnoses the downstream air-fuel ratio sensor for abnormality during execution of the active control in any one of the first to eighth inventions.

In an eleventh invention, the downstream air-fuel ratio sensor is a cup type air-fuel ratio sensor in any one of the first to tenth inventions.

In a twelfth invention, the system turns on a warning light when it is judged that the downstream air-fuel ratio sensor has become abnormal in any one of the first to eleventh inventions.

Advantageous Effects of Invention

According to the present invention, there is provided an abnormality diagnosis system able to accurately diagnose an abnormality of a downstream air-fuel ratio sensor when using an air-fuel ratio sensor as a downstream side sensor.

DESCRIPTION OF EMBODIMENTS

Figure 1:
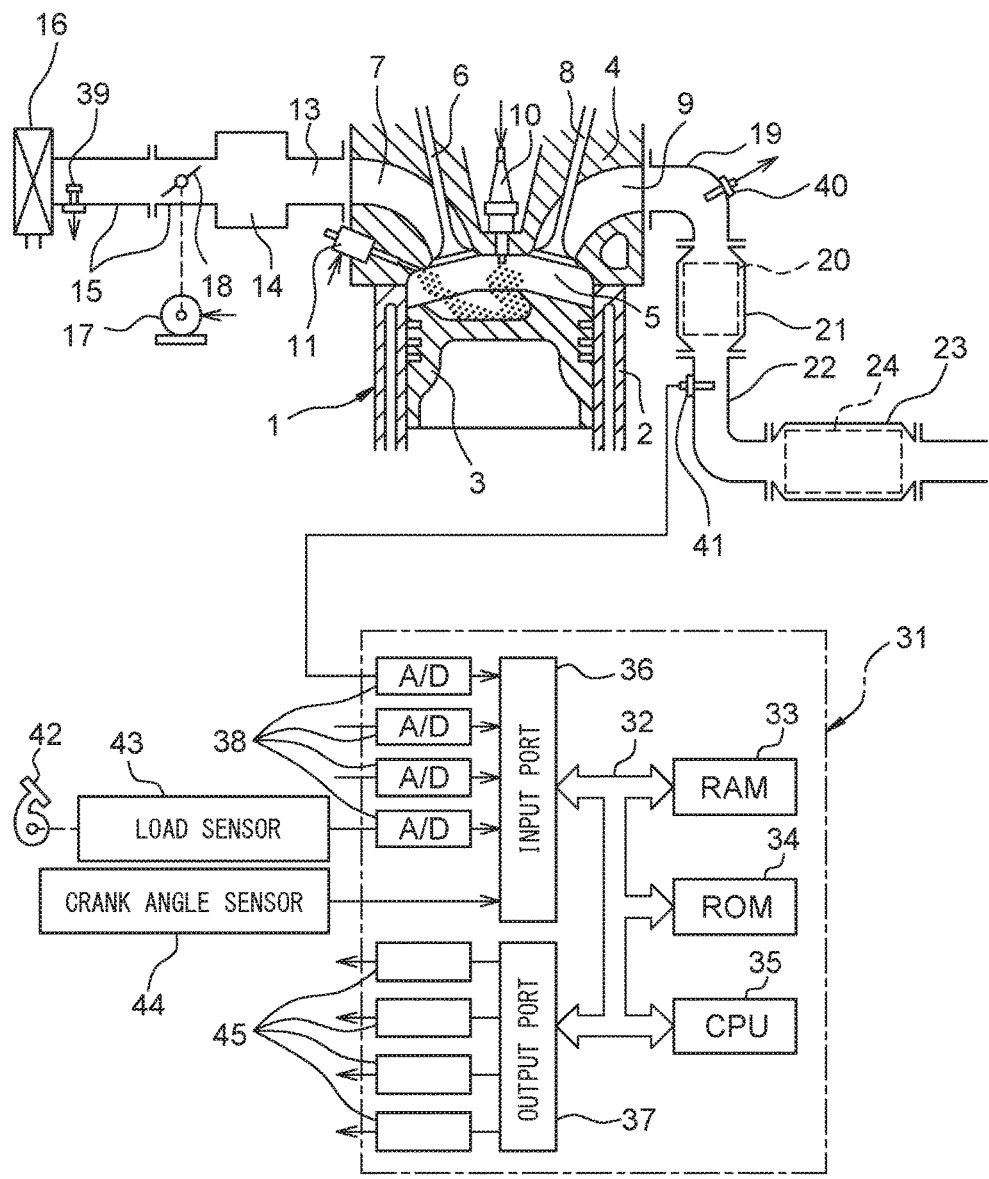
FIG. 1 is a view schematically showing an internal combustion engine in which an abnormality diagnosis system according to a first embodiment of the present invention is used.

Below, referring to the drawings, an embodiment of the present invention will be explained in detail. Note that, in the following explanation, similar component elements are assigned the same reference numerals.

<Explanation of Internal Combustion Engine as a Whole>

FIG. 1 is a view which schematically shows an internal combustion engine in which an abnormality diagnosis system according to a first embodiment of the present invention is used. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine using the diagnosis system of the present invention may also use other fuel.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 is arranged which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36. Note that, the configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as a diagnosis system diagnosing the downstream air-fuel ratio sensor 41 for abnormality.

The upstream side exhaust purification catalyst 20 and downstream side exhaust purification catalyst 24 are three-way catalysts having oxygen storage abilities. Specifically, the exhaust purification catalysts 20 and 24 are comprised of carriers made of ceramic on which precious metal having a catalytic action (for example, platinum (Pt)) and a substance having an oxygen storage ability (for example, ceria ($CeO_2$)) are carried. The exhaust purification catalysts 20 and 24, upon reaching a predetermined activation temperature, exhibit not only catalytic actions of simultaneously removing unburned gas (HC or CO etc.) and nitrogen oxides ($NO_X$), but also oxygen storage ability.

According to the oxygen storage abilities of the exhaust purification catalysts 20 and 24, the exhaust purification catalysts 20 and 24 store oxygen in the exhaust gas when the air-fuel ratio of the exhaust gas flowing into the exhaust purification catalysts 20 and 24 is leaner than the stoichiometric air-fuel ratio (below, referred to as "lean air-fuel ratio"). On the other hand, the exhaust purification catalysts 20 and 24 release the oxygen stored in the exhaust purification catalysts 20 and 24 when the air-fuel ratio of the inflowing exhaust gas is richer than the stoichiometric air-fuel ratio (below, referred to as "rich air-fuel ratio"). As a result, so long as the oxygen storage abilities of the exhaust purification catalysts 20 and 24 are maintained, regardless of the air-fuel ratio of the exhaust gas flowing into the exhaust purification catalysts 20 and 24, the air-fuel ratio of the exhaust gas flowing out from the exhaust purification catalysts 20 and 24 becomes substantially the stoichiometric air-fuel ratio.

<Explanation of Air-Fuel Ratio Sensor>

Figure 2:
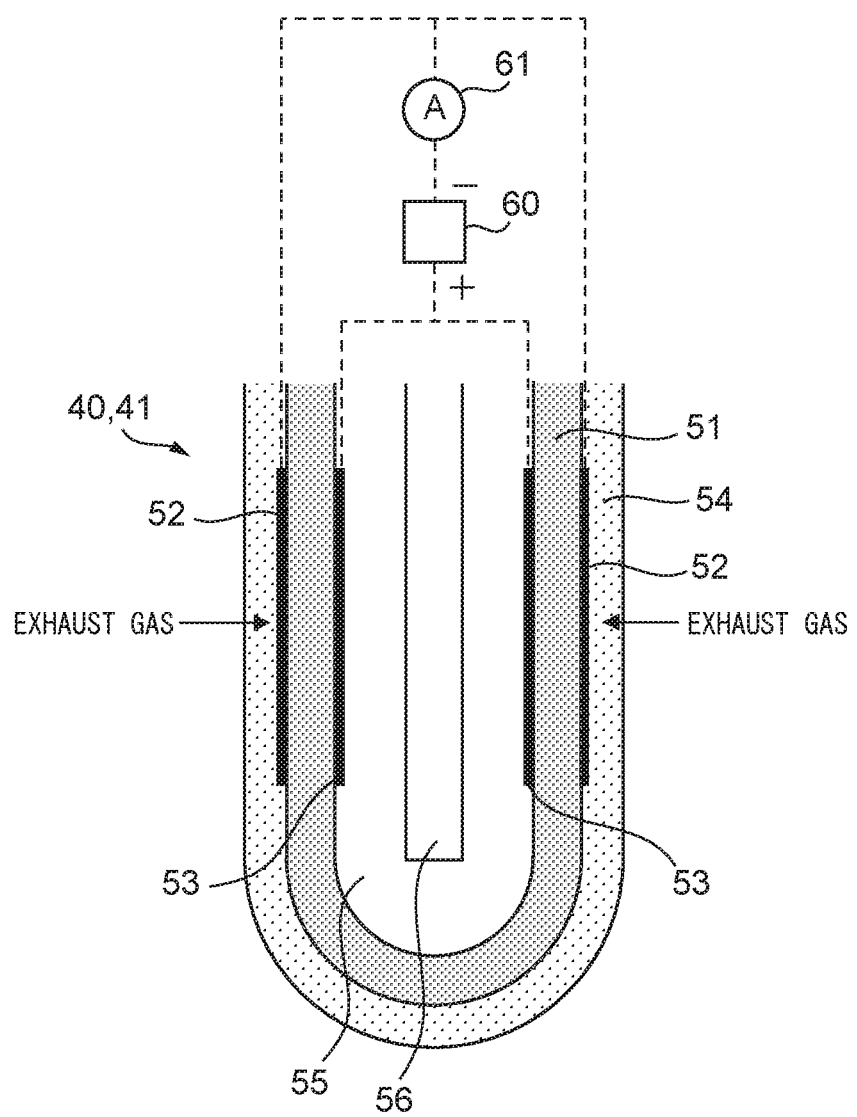
FIG. 2 is a schematic cross-sectional view of an air-fuel ratio sensor.

In the present embodiment, as the air-fuel ratio sensors 40 and 41, cup type limit current type air-fuel ratio sensors are used. FIG. 2 will be used to simply explain the structures of the air-fuel ratio sensors 40 and 41. Each of the air-fuel ratio sensors 40 and 41 is provided with a solid electrolyte layer 51, an exhaust side electrode 52 which is arranged on one side surface of the same, an atmosphere side electrode 53 which is arranged on the other side surface, a diffusion regulation layer 54 which regulates the diffusion of the flowing exhaust gas, a reference gas chamber 55, and a heater part 56 which heats the air-fuel ratio sensor 40 or 41.

In particular, in each of the cup type air-fuel ratio sensors 40 and 41 of the present embodiment, the solid electrolyte layer 51 is formed into a cylindrical shape with one closed end. Inside of the reference gas chamber 55 which is defined inside of the solid electrolyte layer 51, atmospheric gas (air) is introduced and the heater part 56 is arranged. On the inside surface of the solid electrolyte layer 51, an atmosphere side electrode 53 is arranged. On the outside surface of the solid electrolyte layer 51, an exhaust side electrode 52 is arranged. On the outside surfaces of the solid electrolyte layer 51 and the exhaust side electrode 52, a diffusion regulation layer 54 is arranged to cover the same. Note that, at the outside of the diffusion regulation layer 54, a protective layer (not shown) may be provided for preventing a liquid etc. from depositing on the surface of the diffusion regulation layer 54.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 are formed by platinum or other precious metal with a high catalytic activity.

Further, between the exhaust side electrode 52 and the atmosphere side electrode 53, sensor voltage V is supplied by the voltage control device 60 which is mounted on the ECU 31. In addition, the ECU 31 is provided with a current detection device 61 which detects the current I which flows between these electrodes 52 and 53 through the solid electrolyte layer when the sensor voltage is applied. The current which is detected by this current detection device 61 is the output current of the air-fuel ratio sensors 40 and 41.

Figure 3:
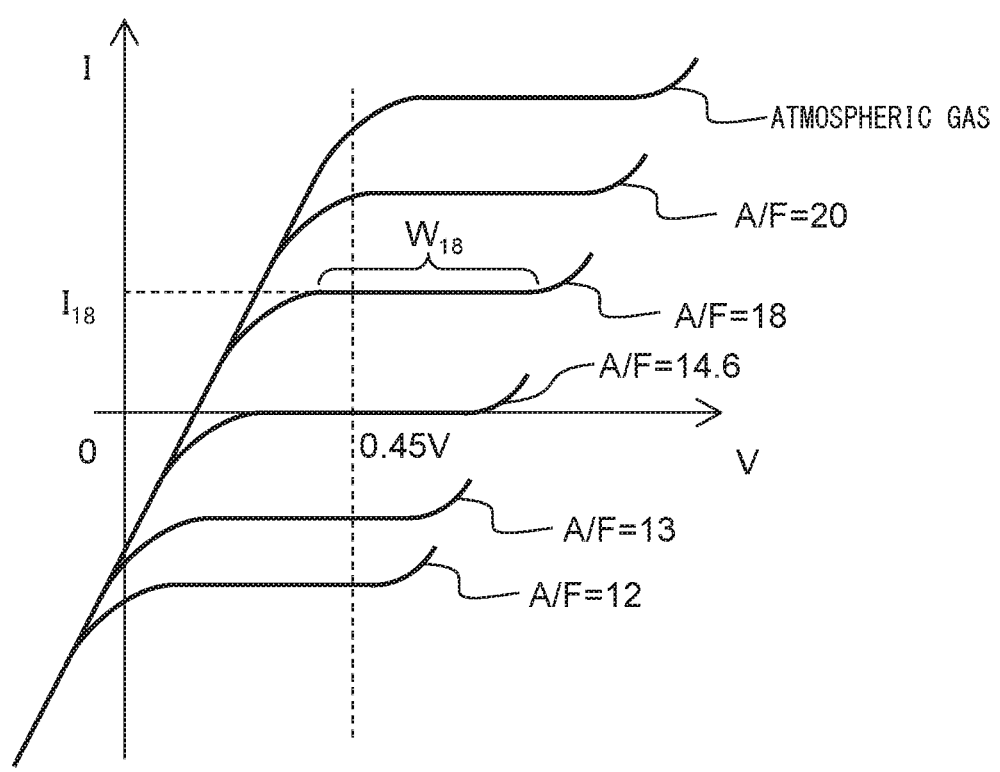
FIG. 3 is a view showing a relationship between a sensor applied voltage and output current at different exhaust air-fuel ratios.

The thus configured air-fuel ratio sensors 40 and 41 have the voltage-current (V-I) characteristic such as shown in FIG. 3. As will be understood from FIG. 3, the output current I and 41 becomes larger the higher (leaner) the exhaust air-fuel ratio. Further, at the line V-I of each exhaust air-fuel ratio, there is a region parallel to the V axis, that is, a region where the output current does not change much at all even if the sensor voltage changes. This voltage region is called the "limit current region". The current at this time is called the "limit current". In FIG. 3, the limit current region and limit current when the exhaust air-fuel ratio is 18 are shown by $W_{18}$ and $I_{18}$, respectively.

Figure 4:
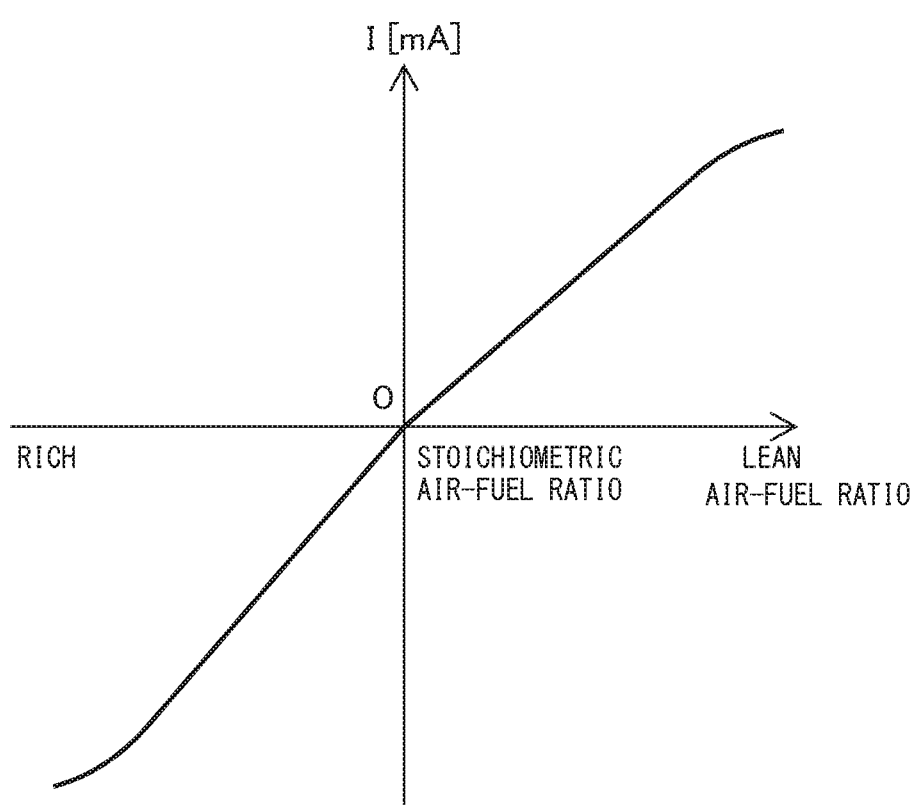
FIG. 4 is a view showing a relationship between an exhaust air-fuel ratio and output current when making an applied voltage constant.

FIG. 4 is a view showing the relationship between the exhaust air-fuel ratio and output current I when making the applied voltage constant at about 0.45V. As will be understood from FIG. 4, in each of the air-fuel ratio sensors 40 and 41, the higher the exhaust air-fuel ratio (that is, the leaner), the larger the output current I from the air-fuel ratio sensor 40 or 41. In addition, the air-fuel ratio sensors 40 and 41 are configured so that when the exhaust air-fuel ratio is the stoichiometric air-fuel ratio, the output current I becomes zero. Further, when the exhaust air-fuel ratio becomes larger by a certain extent or more or when it becomes smaller by a certain extent, the ratio of change of the output current to the change of the exhaust air-fuel ratio becomes smaller.

Note that, in the above example, as the air-fuel ratio sensors 40 and 41, limit current types of air-fuel ratio sensors of the structures shown in FIG. 2 are used. However, as the upstream side air-fuel ratio sensor 40, for example, a stacked type limit current type air-fuel ratio sensor or other structure of limit current type of air-fuel ratio sensor or an air-fuel ratio sensor not of the limit current type or any other air-fuel ratio sensor may also be used.

<Basic Control>

In the thus configured internal combustion engine, the fuel injection amount from the fuel injector 11 is set based on the outputs of the upstream side air-fuel ratio sensor 40 and the downstream air-fuel ratio sensor 41 so that the air-fuel ratio of the exhaust gas flowing into the upstream side exhaust purification catalyst 20 becomes the optimal air-fuel ratio based on the engine operating state. As the method of setting such a fuel injection amount, the method of performing control based on the output of the upstream air-fuel ratio sensor 40 so that the air-fuel ratio of the exhaust gas flowing into the upstream side exhaust purification catalyst 20 (or the target air-fuel ratio of the exhaust gas flowing out from the engine body) becomes the target air-fuel ratio and correcting the output of the upstream air-fuel ratio sensor 40 or changing the target air-fuel ratio based on the output of the downstream air-fuel ratio sensor 41 may be mentioned.

Figure 5:
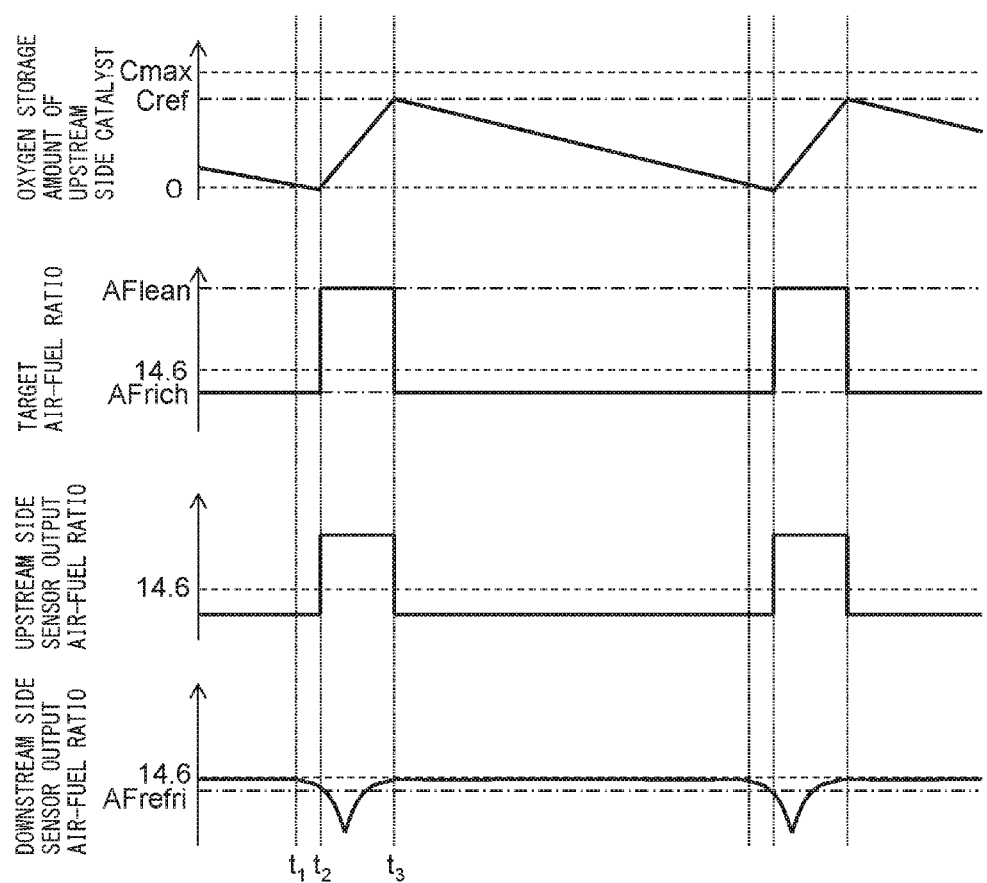
FIG. 5 is a time chart of an oxygen storage amount of the upstream side exhaust purification catalyst etc. at the time of normal operation of an internal combustion engine.

Referring to FIG. 5, an example of such control of the target air-fuel ratio will be simply explained. FIG. 5 is a time chart of the oxygen storage amount of the upstream side exhaust purification catalyst, target air-fuel ratio, output air-fuel ratio of the upstream side air-fuel ratio sensor, and output air-fuel ratio of the downstream air-fuel ratio sensor at the time of normal operation of an internal combustion engine (normal control). Note that, the "output air-fuel ratio" means an air-fuel ratio corresponding to the output of the air-fuel ratio sensor. Further, "the time of normal operation (normal control)" means the operating state (control state) when not performing control for adjusting the fuel injection amount according to a specific operating state of the internal combustion engine (for example, correction to increase the fuel injection amount performed at the time of acceleration of the vehicle mounting the internal combustion engine, later explained fuel cut control, etc.)

In the example shown in FIG. 5, when the output air-fuel ratio of the downstream air-fuel ratio sensor 41 becomes a rich judged reference air-fuel ratio (for example, 14.55) or less, the target air-fuel ratio is set to and maintained at a lean set air-fuel ratio AFlean (for example, 15). After that, if the oxygen storage amount of the upstream side exhaust purification catalyst 20 is estimated and this estimated value becomes a predetermined judged reference storage amount Cref (amount smaller than maximum oxygen storage amount Cmax) or more, the target air-fuel ratio is set to and maintained at a rich set air-fuel ratio AFrich (for example, 14.4). In the example shown in FIG. 5, such an operation is repeated.

Specifically, in the example shown in FIG. 5, before the time $t_1$, the target air-fuel ratio is made the rich set air-fuel ratio AFrich. Along with this, the output air-fuel ratio of the upstream air-fuel ratio sensor 40 also becomes a rich air-fuel ratio. Further, the upstream side exhaust purification catalyst 20 stores oxygen, so the output air-fuel ratio of the downstream air-fuel ratio sensor 41 becomes substantially the stoichiometric air-fuel ratio (14.6). At this time, the air-fuel ratio of the exhaust gas flowing into the upstream side exhaust purification catalyst 20 becomes the rich air-fuel ratio, so the oxygen storage amount of the upstream side exhaust purification catalyst 20 gradually falls.

After that, at the time $t_1$, the oxygen storage amount of the upstream side exhaust purification catalyst 20 approaches zero whereby part of the unburned gas flowing into the upstream side exhaust purification catalyst 20 starts to flow out without being removed by the upstream side exhaust purification catalyst 20. As a result, at the time $t_2$, the output air-fuel ratio of the downstream air-fuel ratio sensor 41 becomes a rich judged reference air-fuel ratio AFrefri slightly richer than the stoichiometric air-fuel ratio. At this time, the target air-fuel ratio is switched from the rich set air-fuel ratio AFrich to the lean set air-fuel ratio AFlean.

By switching the target air-fuel ratio, the air-fuel ratio of the exhaust gas flowing into the upstream side exhaust purification catalyst 20 becomes the lean air-fuel ratio and the outflow of unburned gas decreases and stops. Further, the oxygen storage amount of the upstream side exhaust purification catalyst 20 gradually increases and, at the time $t_3$, reaches the judged reference storage amount Cref. If, in this way, the oxygen storage amount reaches the judged reference storage amount Cref, the target air-fuel ratio is again switched from the lean set air-fuel ratio AFlena to the rich set air-fuel ratio AFrich. Due to the switching of this target air-fuel ratio, the air-fuel ratio of the exhaust gas flowing into the upstream side exhaust purification catalyst 20 again becomes the lean air-fuel ratio. As a result, the oxygen storage amount of the upstream side exhaust purification catalyst 20 gradually decreases. After that, this operation is repeated. By performing such control, it is possible to prevent the outflow of $NO_X$ from the upstream side exhaust purification catalyst 20.

Note that, the control of the target air-fuel ratio based on the outputs of the upstream side air-fuel ratio sensor 40 and the downstream air-fuel ratio sensor 41 performed as normal control is not limited to the above-mentioned such control. So long as control is based on the outputs of these air-fuel ratio sensors 40 and 41, it may be any control. Therefore, for example, as normal control, it is possible to fix the target air-fuel ratio at the stoichiometric air-fuel ratio and perform feedback control so that the output air-fuel ratio of the upstream air-fuel ratio sensor 40 becomes the stoichiometric air-fuel ratio and to perform control to correct the output air-fuel ratio of the upstream air-fuel ratio sensor 40 based on the output air-fuel ratio of the downstream air-fuel ratio sensor 41.

<Cracked Element of Air-Fuel Ratio Sensor>

Figure 6:
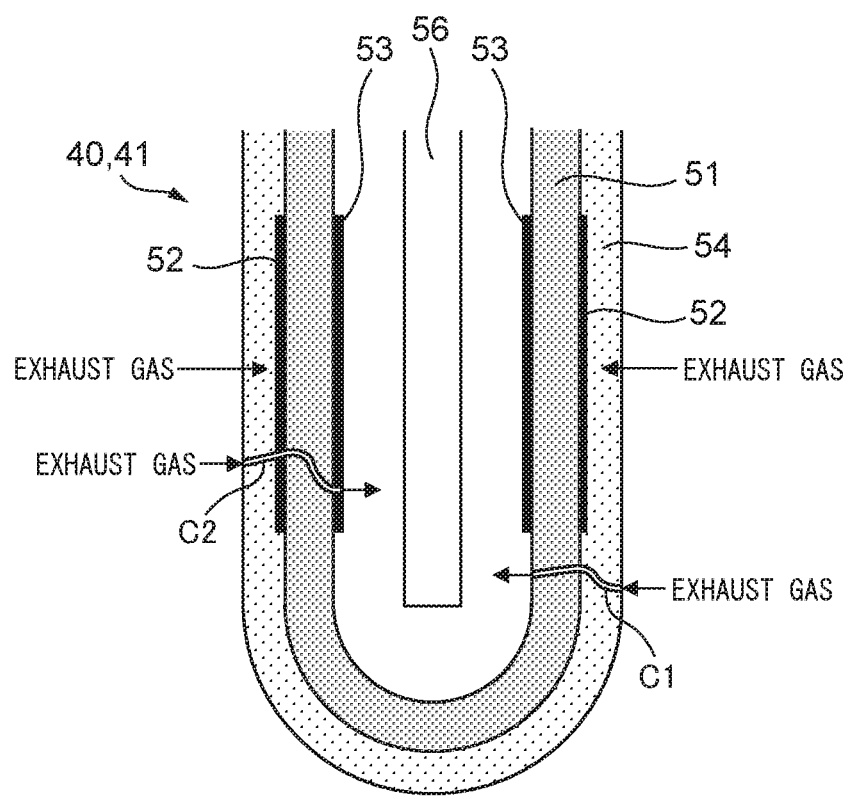
FIG. 6 is a schematic cross-sectional view of an air-fuel ratio sensor in which an abnormality of a cracked element has occurred.

In this regard, as an abnormality which occurs at the above-mentioned such air-fuel ratio sensors 40, 41, cracking of the element forming the air-fuel ratio sensor 40 or 41, that is, the phenomenon referred to as a "cracked element", may be mentioned. Specifically, a crack which passes through the solid electrolyte layer 51 and diffusion regulating layer 54 (C1 of FIG. 6) or a crack which passes through the solid electrolyte layer 51 and diffusion regulating layer 54 plus the two electrodes 52, 53 (C2 of FIG. 6) sometimes occurs. If such a cracked element occurs, as shown in FIG. 6, exhaust gas enters into the reference gas chamber 55 through the cracked part.

As a result, when the air-fuel ratio of the exhaust gas around the air-fuel ratio sensors 40 and 41 is the rich air-fuel ratio, rich air-fuel ratio exhaust gas enters the reference gas chamber 55. Due to this, rich air-fuel ratio exhaust gas diffuses inside the reference gas chamber 55, and the atmosphere side electrode 53 is exposed to the rich air-fuel ratio exhaust gas. On the other hand, in this case as well, the exhaust side electrode 52 is exposed to exhaust gas through the diffusion regulating layer 54. For this reason, compared to the atmosphere side electrode 53, the exhaust side electrode 52 becomes relatively lean. As a result, the output air-fuel ratios of the air-fuel ratio sensors 40 and 41 become lean air-fuel ratios. That is, if the air-fuel ratio sensors 40 and 41 have cracked elements, even if the air-fuel ratio of the exhaust gas around the air-fuel ratio sensors 40 and 41 is the rich air-fuel ratio, the output air-fuel ratios of the air-fuel ratio sensors 40 and 41 end up becoming lean air-fuel ratios. On the other hand, if the air-fuel ratio of the exhaust gas around the air-fuel ratio sensors 40 and 41 is the lean air-fuel ratio, such a phenomenon of reversal of the output air-fuel ratio will not occur. This is because when the air-fuel ratio of the exhaust gas is the lean air-fuel ratio, the output currents of the air-fuel ratio sensors 40 and 41 depend on the amount of oxygen reaching the surface of the exhaust side electrode 53 through the diffusion regulating layer 54 rather than the difference of the air-fuel ratios at the two sides of the solid electrolyte layer 51.

<Abnormality Diagnosis>

In the present embodiment, the above-mentioned such property of the abnormality of a cracked element of the downstream air-fuel ratio sensor 41 is utilized to diagnose the downstream air-fuel ratio sensor 41 for the abnormality of a cracked element. Specifically, the ECU 31 performs active control when predetermined conditions stand. In active control, the fuel injection amount from the fuel injector 11 is controlled so that the target air-fuel ratio of the exhaust gas flowing into the upstream side exhaust purification catalyst 20 (or the target air-fuel ratio of the exhaust gas flowing out from the engine body) becomes the rich air-fuel ratio. Further, along with this, the actual air-fuel ratio of the exhaust gas flowing into the upstream side exhaust purification catalyst 20 also becomes the rich air-fuel ratio.

Figure 7:
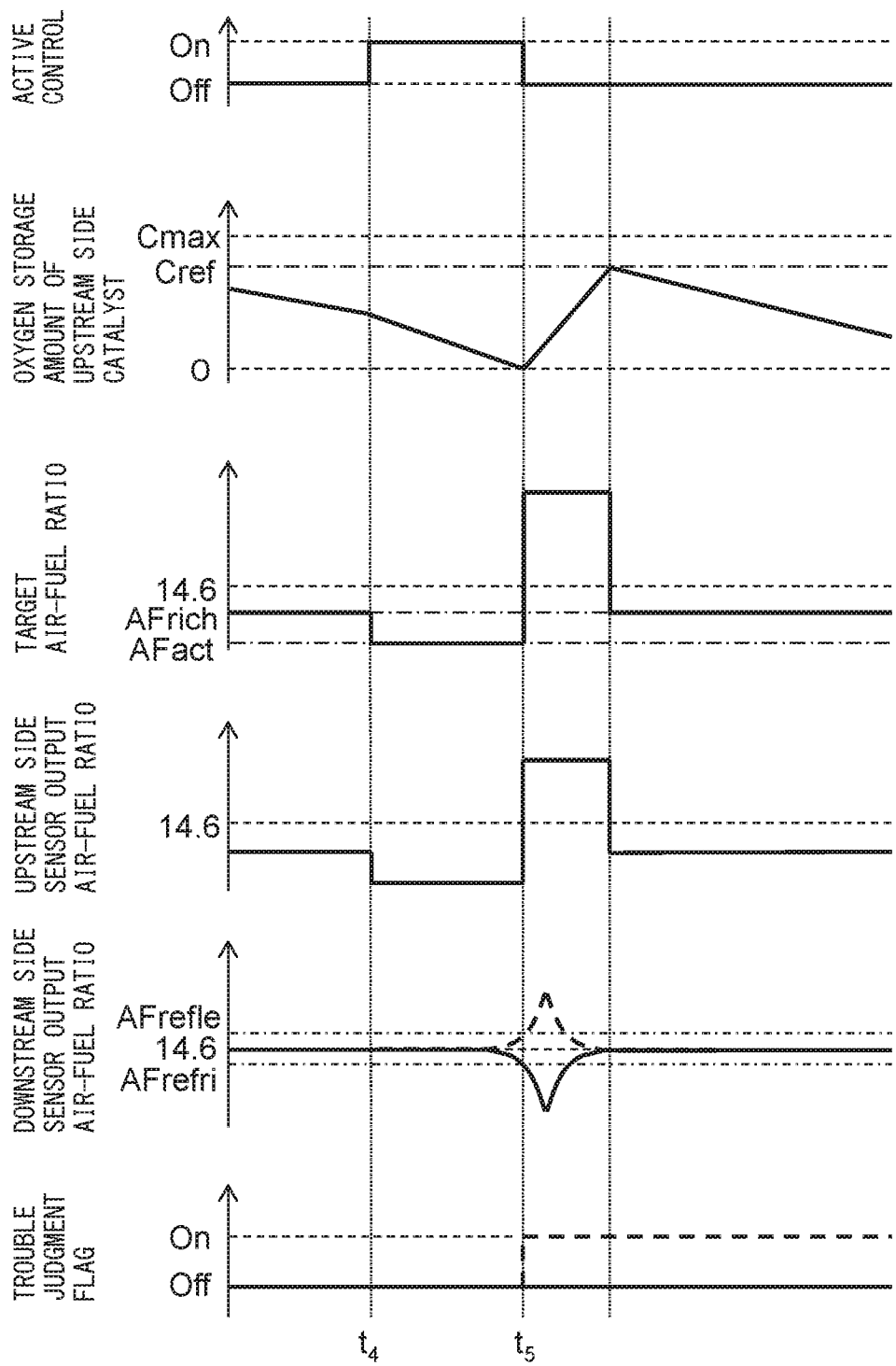
FIG. 7 is a time chart of an output air-fuel ratio of an air-fuel ratio sensor, etc. in the case of performing active control.

FIG. 7 is a time chart of the output air-fuel ratio of an air-fuel ratio sensor in the case of performing active control. In the example shown in FIG. 7, active control is started at the time $t_4$. If active control is started at the time $t_4$, the target air-fuel ratio is set to the rich air-fuel ratio. In particular, in the illustrated example, the target air-fuel ratio at the time of active control is made the active control air-fuel ratio AFact richer than the rich set air-fuel ratio set at the time of normal operation. At this time, the output air-fuel ratio of the upstream air-fuel ratio sensor 40 becomes the rich air-fuel ratio. On the other hand, the unburned HC etc. in the exhaust gas flowing into the upstream side exhaust purification catalyst 20 react with the oxygen stored in the upstream side exhaust purification catalyst 20 and are removed. For this reason, the output air-fuel ratio of the downstream air-fuel ratio sensor 41 becomes substantially the stoichiometric air-fuel ratio.

Due to the active control, rich air-fuel ratio exhaust gas flows into the upstream side exhaust purification catalyst 20, so the oxygen storage amount of the upstream side exhaust purification catalyst 20 gradually decreases. During this time as well, the output air-fuel ratio of the upstream air-fuel ratio sensor 40 becomes the rich air-fuel ratio, while the output air-fuel ratio of the downstream air-fuel ratio sensor 41 becomes substantially the stoichiometric air-fuel ratio. Finally, the oxygen storage amount becomes substantially zero. Due to this, rich air-fuel ratio exhaust gas containing unburned HC etc. flows out from the upstream side exhaust purification catalyst 20. That is, the actual air-fuel ratio of the exhaust gas flowing around the downstream air-fuel ratio sensor 41 becomes the rich air-fuel ratio.

Here, when the downstream air-fuel ratio sensor 41 does not suffer from the abnormality of a cracked element, as shown in FIG. 7 by the solid line, along with the actual air-fuel ratio, the output air-fuel ratio of the downstream air-fuel ratio sensor 41 also becomes the rich air-fuel ratio. Therefore, in the present embodiment, when the output air-fuel ratio of the upstream air-fuel ratio sensor 40 becomes the rich air-fuel ratio, in particular, when the output air-fuel ratio of the upstream air-fuel ratio sensor 40 changes from a lean air-fuel ratio leaner than the stoichiometric air-fuel ratio to a rich air-fuel ratio and is maintained at the rich air-fuel ratio, if the output air-fuel ratio of the downstream air-fuel ratio sensor 41 changes from an air-fuel ratio leaner than the rich judged reference air-fuel ratio AFrefri (for example, substantially stoichiometric air-fuel ratio) to an air-fuel ratio richer than that (time $t_5$), it is judged that the downstream air-fuel ratio sensor 41 does not suffer from the abnormality of a cracked element. Note that, in the present embodiment, the rich judged reference air-fuel ratio AFrefri at this time is the same as the rich judged reference air-fuel ratio AFrefri at the time of normal operation, but it may also be a different value. As a result, the abnormality judgment flag is left OFF.

On the other hand, when the downstream air-fuel ratio sensor 41 suffers from the abnormality of a cracked element, as shown in FIG. 7 by the broken line, unlike the actual air-fuel ratio, the output air-fuel ratio of the downstream air-fuel ratio sensor 41 becomes the lean air-fuel ratio. Therefore, in the present embodiment, when the output air-fuel ratio of the upstream air-fuel ratio sensor 40 is the rich air-fuel ratio, if the output air-fuel ratio of the downstream air-fuel ratio sensor 41 changes from an air-fuel ratio richer than a lean judged reference air-fuel ratio AFrefle slightly leaner than the stoichiometric air-fuel ratio (for example, substantially stoichiometric air-fuel ratio) to an air-fuel ratio leaner than this (time $t_5$), it is judged that the downstream air-fuel ratio sensor 41 has the abnormality of a cracked element. As a result, the abnormality judgment flag is set ON.

If the downstream air-fuel ratio sensor 41 is diagnosed for abnormality in this way, the active control is stopped and normal operation is resumed. In particular, in the example shown in FIG. 7, the downstream air-fuel ratio sensor 41 is diagnosed for abnormality at the time $t_5$, so, at the time $t_5$, active control is stopped. After that, if normal operation is resumed, the output air-fuel ratio of the downstream air-fuel ratio sensor 41 becomes the rich judged reference air-fuel ratio AFrefri or less, so the target air-fuel ratio is set to the lean set air-fuel ratio AFlean and the control shown in FIG. 5 is repeated.

In this way, according to the present embodiment, if the output air-fuel ratio of the upstream side air-fuel ratio sensor is a rich air-fuel ratio, after the output air-fuel ratio of the downstream air-fuel ratio sensor 41 becomes the substantially stoichiometric air-fuel ratio once, the downstream air-fuel ratio sensor 41 is diagnosed for abnormality based on what kind of air-fuel ratio was changed to. Due to this, the downstream side sensor which is an air-fuel ratio sensor can be diagnosed for the abnormality of a cracked element.

Note that, the above-mentioned rich judged reference air-fuel ratio AFrefri and lean judged reference air-fuel ratio AFrefle are made air-fuel ratios outside the range in which the output air-fuel ratio of a normal air-fuel ratio sensor would fluctuate near the stoichiometric air-fuel ratio when the oxygen storage amount of the upstream side exhaust purification catalyst 20 is an amount of an intermediate extent.

In this regard, in the present embodiment, active control is performed when certain execution conditions stand and is not performed when they do not stand. In other words, the abnormality diagnosis of the downstream air-fuel ratio sensor 41 is performed when certain execution conditions stand and is not performed when they do not stand.

Here, "when certain execution conditions stand" means, for example, when all of the following conditions are satisfied. A first condition is that the two air-fuel ratio sensors 40 and 41 are active, that is, the temperatures of the two air-fuel ratio sensors 40 and 41 are the activation temperatures or more. If the air-fuel ratio sensors 40 and 41 are not active, basically they cannot accurately detect the air-fuel ratio of the exhaust gas. Further, even if the abnormality of a cracked element occurs, deviation of the output air-fuel ratios is unlikely to occur.

Figure 8:
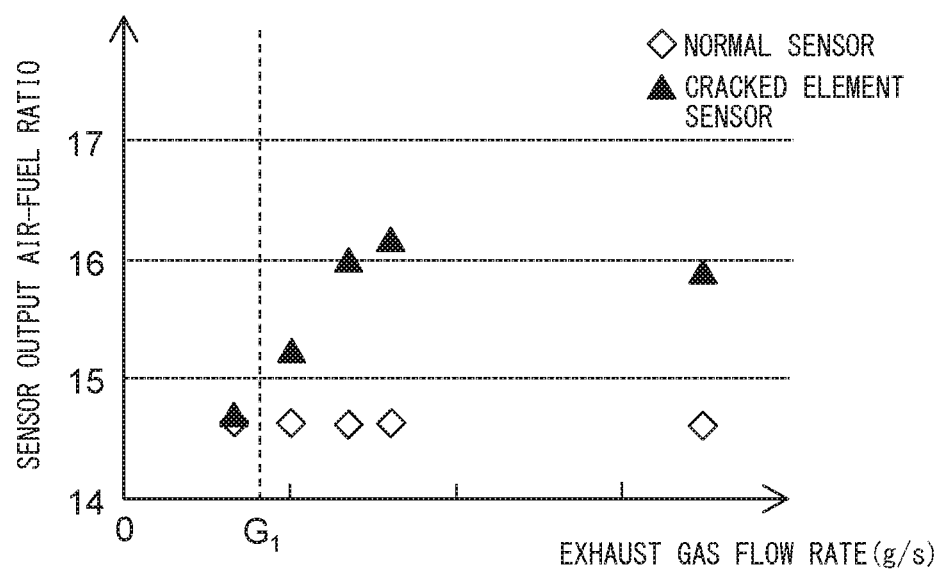
FIG. 8 is a view showing the relationship between the flow rate of the exhaust gas flowing around the downstream air-fuel ratio sensor and the output of the downstream air-fuel ratio sensor air-fuel ratio.

A second condition is that the flow rate of the exhaust gas flowing around the downstream air-fuel ratio sensor 41 is a predetermined lower limit flow rate or more. FIG. 8 is a view showing the relationship between the flow rate of the exhaust gas flowing around the downstream air-fuel ratio sensor 41 and the output air-fuel ratio of the downstream air-fuel ratio sensor 41. In the illustrated example, the air-fuel ratio of the exhaust gas flowing around the downstream air-fuel ratio sensor 41 is a rich air-fuel ratio slightly richer than the stoichiometric air-fuel ratio.

As will be understood from FIG. 8, when the flow rate of the exhaust gas flowing around the downstream air-fuel ratio sensor 41 is small, there is almost no difference in the output air-fuel ratio between a normal sensor and a sensor suffering from a cracked element. As opposed to this, if the flow rate of the exhaust gas becomes greater, in a sensor suffering from a cracked element, the output air-fuel ratio becomes lean. Therefore, if the flow rate of the exhaust gas flowing around the downstream air-fuel ratio sensor 41 is small, even if the abnormality of a cracked element occurs, no change occurs in the output air-fuel ratio.

In addition, as shown in FIG. 8, in a sensor suffering from a cracked element, as the flow rate of the exhaust gas flowing around the downstream air-fuel ratio sensor 41 becomes greater, the output air-fuel ratio of the downstream air-fuel ratio sensor 41 shifts to the lean side. Therefore, when the flow rate of the exhaust gas flowing around the downstream air-fuel ratio sensor 41 is small, even if a cracked element has occurred, the lean degree at the output air-fuel ratio of the downstream air-fuel ratio sensor 41 is sometimes small and the lean judged reference air-fuel ratio AFrefri is not reached.

Therefore, in the present embodiment, the flow rate of the exhaust gas being a predetermined lower limit flow rate, that is, a flow rate where the output air-fuel ratio changes between a normal sensor and a sensor suffering from a cracked element (for example, $G_1$ of FIG. 8), or more is made a condition for active control.

Note that, the flow rate of the exhaust gas flowing around the downstream air-fuel ratio sensor 41 is, for example, calculated based on the flow rate of air detected by the air flow meter 39 etc. However, this flow rate of the exhaust gas may also be estimated by another technique. Alternatively, it is possible to provide an air flow meter, etc. for detecting the flow rate of the exhaust gas flowing through the inside of the exhaust passage in the vicinity of the downstream air-fuel ratio sensor 41 and directly detect the flow rate by this air flow meter etc.

A third condition is that the elapsed time from the end of the fuel cut control is a reference elapsed time or more. The "fuel cut control" is control for stopping or greatly decreasing the feed of fuel to the combustion chamber in the state where the internal combustion engine is operating (state where the crankshaft is turning). This fuel cut control is, for example, performed when the amount of depression of the accelerator pedal 42 is zero or substantially zero (that is, the engine load is zero or substantially zero) and the engine speed is a predetermined speed higher than the speed at the time of idling or is more the predetermined speed.

Right after the end of such fuel cut control, even if controlling the fuel injection amount so that the air-fuel ratio of the exhaust gas discharged from the engine body becomes the rich air-fuel ratio, the output air-fuel ratio of a normal air-fuel ratio sensor not suffering from a cracked element will also become the lean air-fuel ratio. For this reason, it is not possible to accurately diagnose the downstream air-fuel ratio sensor 41 for a cracked element until a certain extent of elapsed time passes from the end of fuel cut control. Therefore, in the present embodiment, the elapsed time from the end of the fuel cut control being a reference elapsed time or more, that is, the time required for the output air-fuel ratio to stabilize after fuel cut control ends in a normal air-fuel ratio sensor or more, is made an execution condition for active control.

A fourth condition is that the abnormality judgment of the downstream air-fuel ratio sensor 41 is not completed in the period from when the ignition switch of the vehicle mounting the internal combustion engine is turned ON to the present. The abnormality judgment of the downstream air-fuel ratio sensor 41 does not have to be performed that frequently, so the abnormality judgment is performed only when the abnormality judgment has not been completed. Specifically, the abnormality flag, which is set ON when it is judged there is an abnormality in the abnormality judgment of the downstream air-fuel ratio sensor 41, or the judgment completion flag, which is set ON when the abnormality judgment of the downstream air-fuel ratio sensor 41 is completed, not being ON is made a condition.

Note that, in the above embodiment, during normal operation, the target air-fuel ratio of the exhaust gas flowing into the upstream side exhaust purification catalyst 20 is alternately changed between the rich air-fuel ratio and the lean air-fuel ratio. In such a case, at the time of active control, the target air-fuel ratio of the air-fuel ratio of the exhaust gas flowing into the exhaust purification catalyst is made an air-fuel ratio richer than the rich air-fuel ratio at the time of normal operation (normal control) (in the above embodiment, rich set air-fuel ratio AFrich). However, at the time of normal operation, it is not necessarily required to alternately change the target air-fuel ratio between the rich air-fuel ratio and the lean air-fuel ratio. For example, it is also possible to set the target air-fuel ratio at the stoichiometric air-fuel ratio at all times.

Further, in the above embodiment, active control is performed when diagnosing the downstream air-fuel ratio sensor 41 for abnormality. However, it is not necessarily required to perform active control when diagnosing the downstream air-fuel ratio sensor 41 for abnormality.

For example, right after the end of fuel cut control, in general, post reset rich control is performed for making the air-fuel ratio of the exhaust gas flowing into the upstream side exhaust purification catalyst 20 the rich air-fuel ratio. This is performed to release part or all of the oxygen stored in the upstream side exhaust purification catalyst 20 during fuel cut control. The abnormality diagnosis of the downstream air-fuel ratio sensor 41 may be performed during this post-reset rich control. However, in this case as well, as explained above, it is necessary that the elapsed time from the end of fuel cut control is the reference elapsed time or more.

<Flow Chart>

Figure 9:
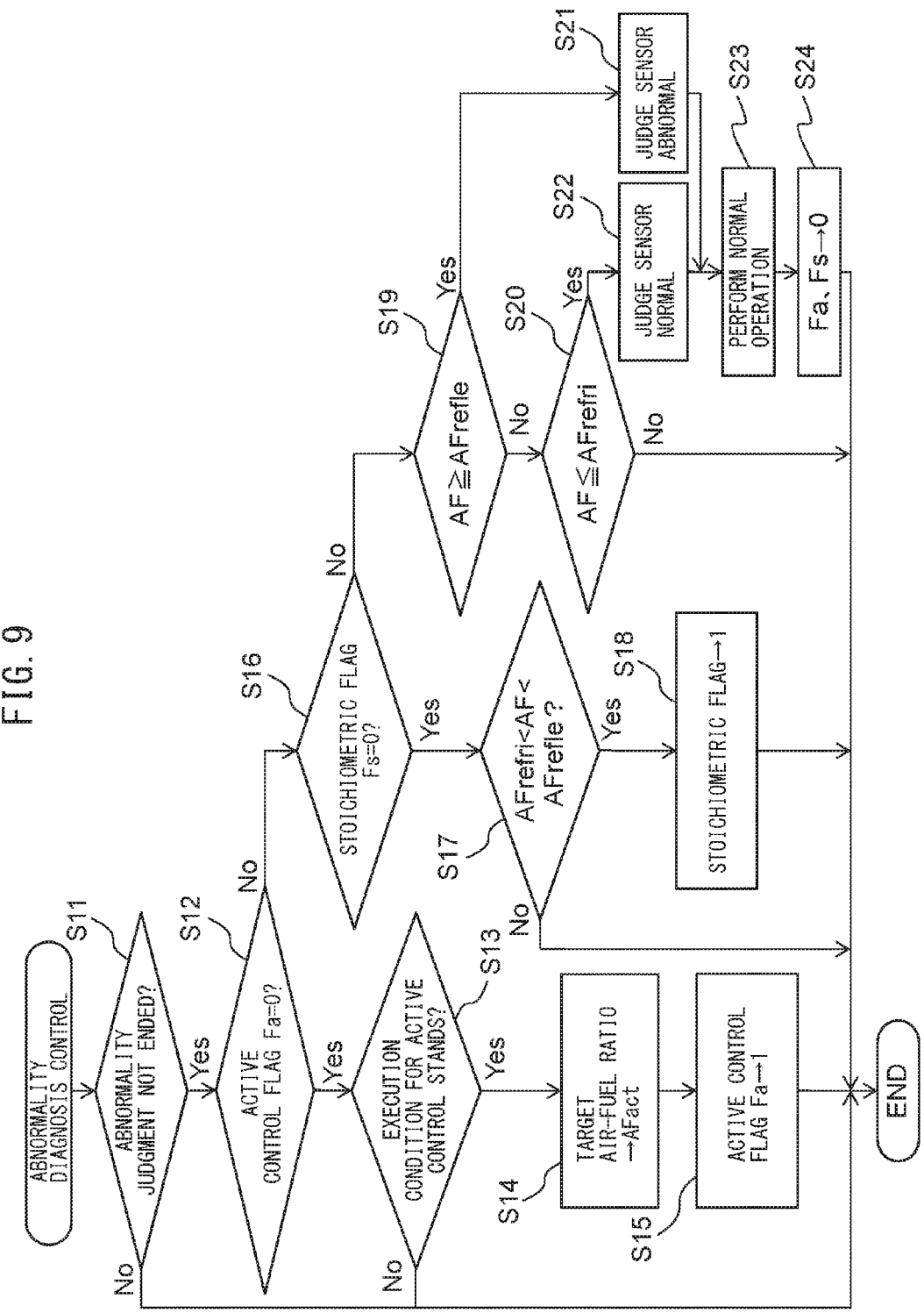
FIG. 9 is a flow chart showing a control routine of abnormality diagnosis control of the downstream air-fuel ratio sensor.

FIG. 9 is a flow chart showing the control routine of the abnormality diagnosis control of the downstream air-fuel ratio sensor 41. The illustrated control routine is performed by interruption at certain time intervals.

First, at step S11, it is judged if after the startup of the internal combustion engine or after the ignition key of the vehicle mounting the internal combustion engine is turned on, the abnormality judgment of the downstream air-fuel ratio sensor 41 has not yet ended. If the abnormality judgment has already been performed after the startup of the internal combustion engine, the control routine is made to end. On the other hand, if it is judged that the abnormality judgment has not yet ended, the routine proceeds to step S12. At step S12, it is judged if the active control flag Fa is "0". The active control flag Fa is a flag set to "1" when active control is being performed and set to "0" otherwise. When active control is still not being performed, the routine proceeds to step S13.

At step S13, it is judged if the execution conditions for active control stand. If the above-mentioned execution conditions for active control do not stand, the control routine is made to end. On the other hand, if the execution conditions for active control stand, the routine proceeds to step S14 and the target air-fuel ratio is set to the active control air-fuel ratio. Next, at step S15, the active control flag Fa is set to "1", and the control routine is made to end.

At the next control routine, since the active control flag Fa is set to "1", the routine proceeds from step S12 to step S16. At step S16, it is judged if the stoichiometric flag Fs is 0. The stoichiometric flag Fs is a flag set to "1" when after the start of active control, the output air-fuel ratio of the downstream air-fuel ratio sensor 41 reaches substantially the stoichiometric air-fuel ratio and set to "0" otherwise. If, at step S16, the stoichiometric flag Fs is 0, the routine proceeds to step S17. At step S17, it is judged if the output air-fuel ratio of the downstream air-fuel ratio sensor 41 is an air-fuel ratio between the rich judged reference air-fuel ratio AFrefri and the lean judged reference air-fuel ratio AFrefle, that is, if it has substantially converged to the stoichiometric air-fuel ratio. When, at step S17, it is judged that the output air-fuel ratio of the downstream air-fuel ratio sensor 41 has not converged to the stoichiometric air-fuel ratio, the control routine is made to end. On the other hand, when, at step S17, it is judged that the output air-fuel ratio of the downstream air-fuel ratio sensor 41 has converged to the stoichiometric air-fuel ratio, the routine proceeds to step S18. At step S18, the stoichiometric flag Fs is set to "1" and the control routine is made to end.

At the next control routine, since the stoichiometric flag Fs is set to "1", the routine proceeds from step S16 to steps S19 and S20. At step S19, it is judged if the output air-fuel ratio of the downstream air-fuel ratio sensor 41 is the lean judged reference air-fuel ratio AFrefle or more, while at step S20, it is judged if the output air-fuel ratio of the downstream air-fuel ratio sensor 41 is the rich judged reference air-fuel ratio AFrefri or less. When, at steps S19 and S20, it is judged that the output air-fuel ratio of the downstream air-fuel ratio sensor 41 is an air-fuel ratio between the rich judged reference air-fuel ratio AFrefri and the lean judged reference air-fuel ratio AFrefle, the control routine is made to end.

On the other hand, when, at step S19, it is judged that the output air-fuel ratio is the lean judged reference air-fuel ratio AFrefle or more, the routine proceeds to step S21. At step S21, it is judged that the downstream air-fuel ratio sensor 41 has become abnormal, the abnormality judgment flag is set to ON, and, due to this, for example, a warning light of the vehicle mounting the internal combustion engine is turned on. Further, if, at step S20, it is judged that the output air-fuel ratio is the rich judged reference air-fuel ratio AFrefri or less, the routine proceeds to step S22. At step S22, it is judged that the downstream air-fuel ratio sensor 41 is normal and the abnormality judgment flag is left OFF.

After step S21 and step S22, the routine proceeds to step S23. At step S23, the target air-fuel ratio is released from the state set to the active control air-fuel ratio and normal operation is made to start. Next, at step S24, the active control flag Fa and stoichiometric flag Fs are reset to 0, and the control routine is made to end.

Second Embodiment

Figure 10:
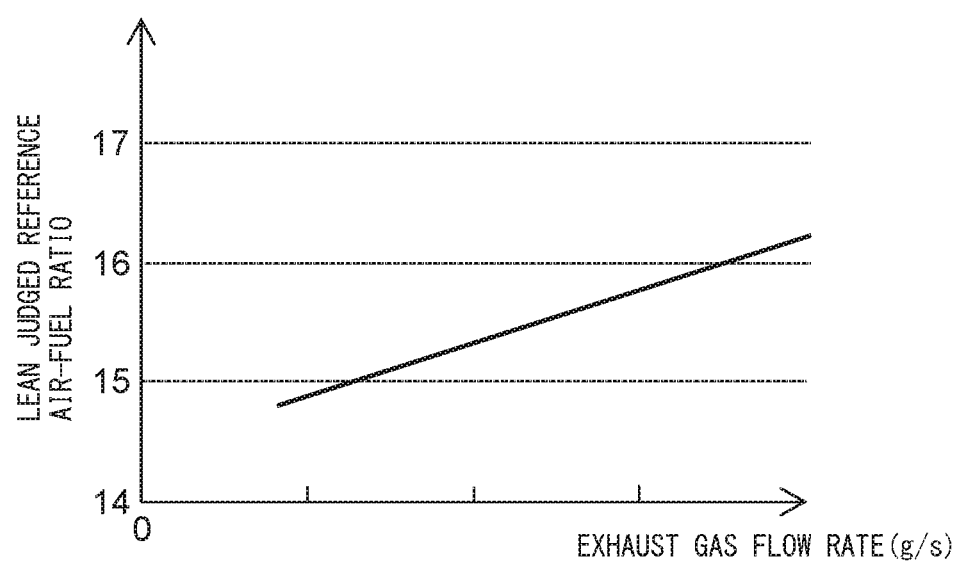
FIG. 10 is a view showing the relationship between the flow rate of the exhaust gas and a lean judged reference air-fuel ratio.

Next, referring to FIG. 10 and FIG. 11, an abnormality diagnosis system of a second embodiment of the present invention will be explained. The configuration etc. of the abnormality diagnosis system of the second embodiment of the present invention is basically similar to the configuration etc. of the abnormality diagnosis system of the first embodiment. However, in the first embodiment, the threshold value for judging abnormality of the downstream air-fuel ratio sensor 41, that is, the lean judged reference air-fuel ratio, was a predetermined constant value, while in the present embodiment, the lean judged reference air-fuel ratio changes according to the flow rate of the exhaust gas flowing around the downstream air-fuel ratio sensor 41.

In this regard, even if the downstream air-fuel ratio sensor 41 is not abnormal and is in the normal state, sometimes the output air-fuel ratio of the downstream air-fuel ratio sensor 41 will become the lean air-fuel ratio during active control.

For example, if the exhaust gas discharged from the engine body contains a large amount of hydrogen, the output air-fuel ratio of the upstream air-fuel ratio sensor 40 will become richer than the actual exhaust air-fuel ratio. In such a case, when performing feedback control of the fuel injection amount based on the output air-fuel ratio of the upstream air-fuel ratio sensor 40, even if the target air-fuel ratio is the rich air-fuel ratio, the actual air-fuel ratio of the exhaust gas flowing into the upstream side exhaust purification catalyst 20 may become the lean air-fuel ratio. As a result, even during active control, the output air-fuel ratio of the downstream air-fuel ratio sensor 41 will end up becoming a lean air-fuel ratio.

In this case, if the lean judged reference air-fuel ratio is set to a relatively low air-fuel ratio, that is, a low lean degree air-fuel ratio, regardless of the fact that the downstream air-fuel ratio sensor 41 is actually in the normal state, it will end up being mistakenly judged that the downstream air-fuel ratio sensor 41 is abnormal. To reduce such mistaken judgment, it is preferable as much as possible to set the lean judged reference air-fuel ratio to a high air-fuel ratio, that is, a high lean degree air-fuel ratio.

Here, as explained referring to FIG. 8, the output air-fuel ratio of the downstream air-fuel ratio sensor 41 when a cracked element has occurred becomes higher the greater the flow rate of the exhaust gas flowing around the sensor. Therefore, in the present embodiment, the lean judged reference air-fuel ratio AFrefle is set based on the flow rate of the exhaust gas flowing around the downstream air-fuel ratio sensor 41. More specifically, as shown in FIG. 10, the greater the flow rate of the exhaust gas flowing around the downstream air-fuel ratio sensor 41 becomes, the higher (the leaner) the lean judged reference air-fuel ratio AFrefle is set. Due to this, the downstream air-fuel ratio sensor 41 is kept from being mistakenly judged to be abnormal.

Figure 11:
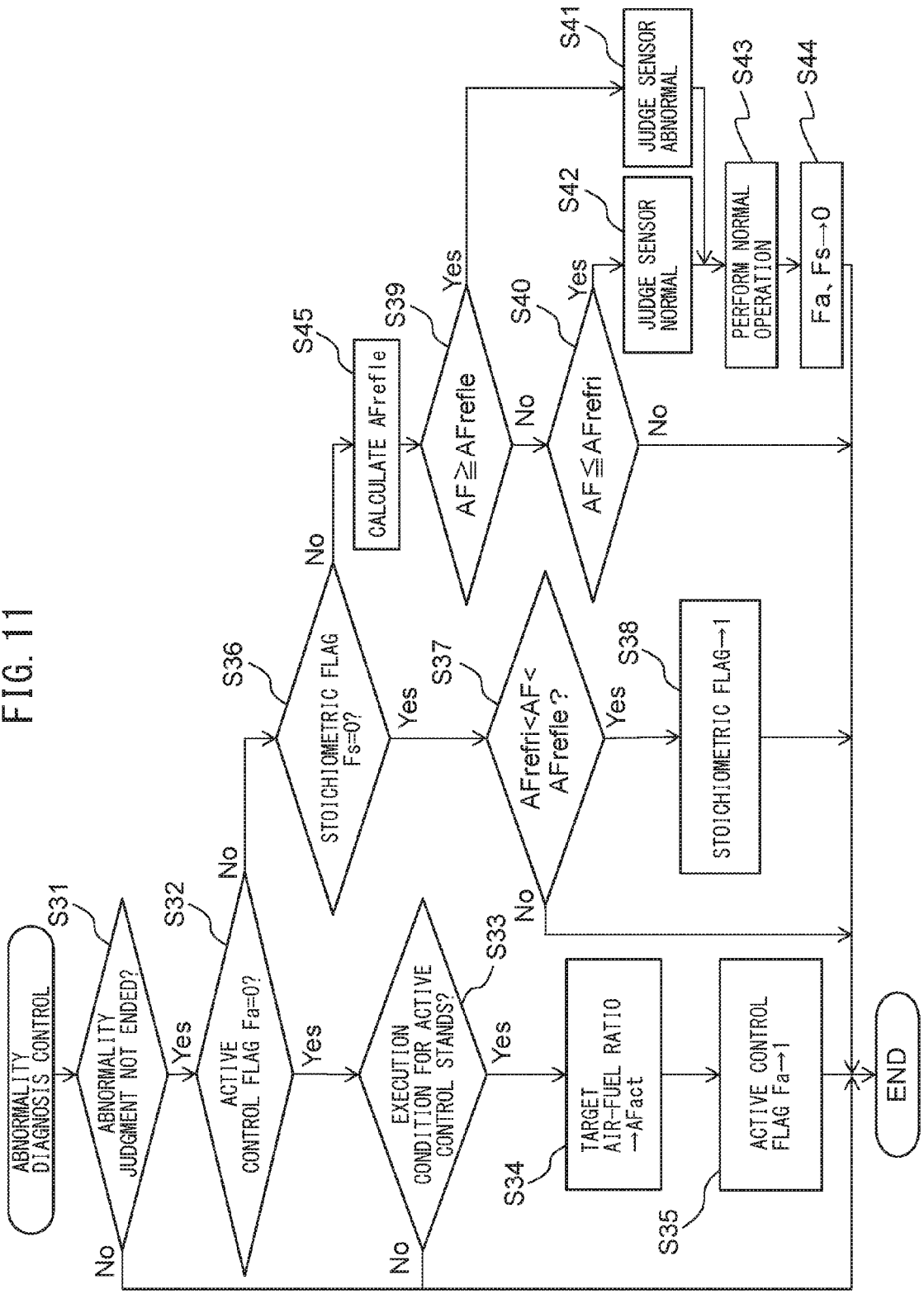
FIG. 11 is a flow chart showing a control routine of abnormality diagnosis control of the downstream air-fuel ratio sensor in a second embodiment.

FIG. 11 is a flow chart showing the control routine of the abnormality diagnosis control of the downstream air-fuel ratio sensor 41 in the second embodiment. The illustrated control routine is performed by interruption at certain time intervals. Note that, steps S31 to S44 of FIG. 11 are similar to steps S11 to S24 of FIG. 9, so explanations will be omitted.

When, at step S36, it is judged that the stoichiometric flag Fs is set to "1", the routine proceeds to step S45. At step S45, for example, the flow rate of the exhaust gas flowing around the downstream air-fuel ratio sensor 41 is calculated based on the output of the air flow meter 39, and the lean judged reference air-fuel ratio AFrefle is calculated based on this flow rate using the map shown in FIG. 10. Note that, in this case, instead of the map shown in FIG. 10, it is possible to use a calculation formula etc. found in advance experimentally or by calculation to calculate the lean judged reference air-fuel ratio AFrefle.

Third Embodiment

Next, referring to FIG. 12 and FIG. 13, an abnormality diagnosis system of a third embodiment of the present invention will be explained. The configuration, etc. of the abnormality diagnosis system of the third embodiment of the present invention is basically similar to the configurations, etc. of the abnormality diagnosis systems of the first embodiment and second embodiment. However, in the present embodiment, the lean judged reference air-fuel ratio is set based on the output air-fuel ratio of the upstream air-fuel ratio sensor 40.

Figure 12:
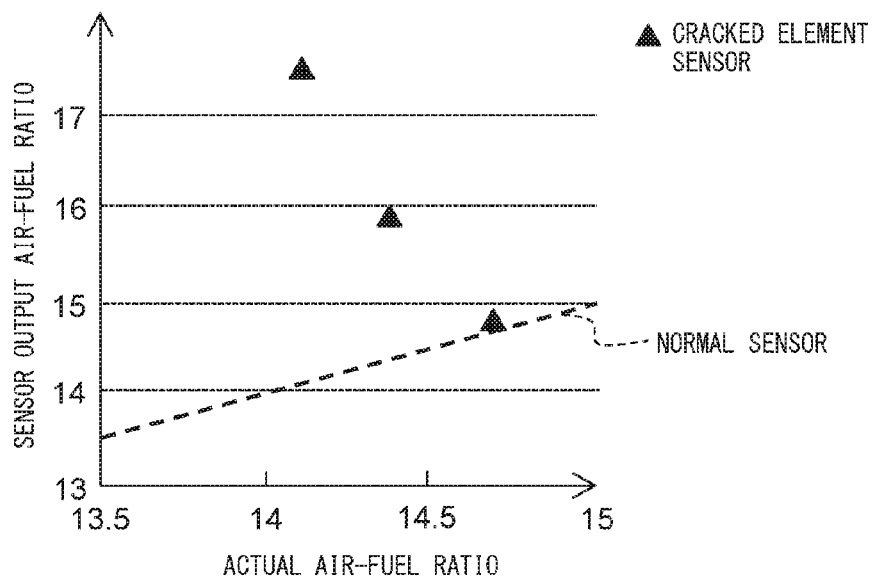
FIG. 12 is a view showing the relationship between the actual air-fuel ratio of the exhaust gas flowing around the downstream air-fuel ratio sensor and the output air-fuel ratio of the downstream air-fuel ratio sensor.

FIG. 12 is a view showing the relationship between the actual air-fuel ratio of exhaust gas flowing around the downstream air-fuel ratio sensor 41 and the output air-fuel ratio of the downstream air-fuel ratio sensor 41. In FIG. 12, the broken line shows the relationship between the actual air-fuel ratio and the output air-fuel ratio in the case where the downstream air-fuel ratio sensor 41 is in the normal state. As will be understood from FIG. 12, in a sensor in which a cracked element has occurred, as the actual air-fuel ratio becomes richer, the output air-fuel ratio becomes higher (leaner). This is because the richer the actual air-fuel ratio becomes, the greater the difference between the air-fuel ratios around the two electrodes 52 and 53 of the air-fuel ratio sensor where the cracked element has occurred.

Therefore, in the present embodiment, the lean judged reference air-fuel ratio AFrefle is set based on the output air-fuel ratio of the upstream air-fuel ratio sensor 40. More specifically, as shown in FIG. 13, the lower the output air-fuel ratio of the upstream air-fuel ratio sensor 40 becomes, the higher (the leaner) the lean judged reference air-fuel ratio AFrefle is set. Due to this, the downstream air-fuel ratio sensor 41 is kept from being mistakenly judged to be abnormal.

Figure 13:
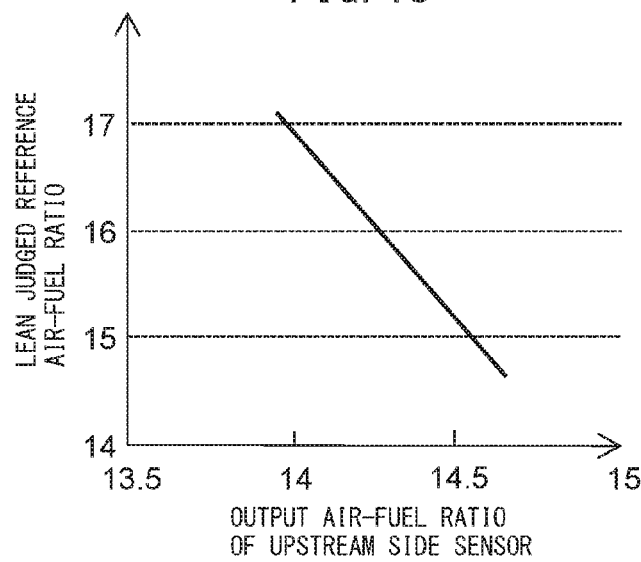
FIG. 13 is a view showing the relationship between the output air-fuel ratio of the upstream side air-fuel ratio sensor and a lean judged reference air-fuel ratio.

Note that, in the present embodiment as well, at step S45 of FIG. 11, the lean judged reference air-fuel ratio AFrefle is calculated based on the output air-fuel ratio of the upstream air-fuel ratio sensor 40 using the map shown in FIG. 13. Further, in this case, instead of the map shown in FIG. 13, it is possible to use a calculation formula etc. found in advance experimentally or by calculation to calculate the lean judged reference air-fuel ratio AFrefle.

Further, the second embodiment and the third embodiment can also be combined. In this case, the lean judged reference air-fuel ratio AFrefle is set based on the flow rate of the exhaust gas flowing around the downstream air-fuel ratio sensor 41 and the output air-fuel ratio of the upstream air-fuel ratio sensor 40.

REFERENCE SIGNS LIST 1. engine body
5. combustion chamber
7. intake port
9. exhaust port
19. exhaust manifold
20. upstream side exhaust purification catalyst
24. downstream side exhaust purification catalyst
31. ECU
40. upstream side air-fuel ratio sensor
41. downstream air-fuel ratio sensor

The invention claimed is:
1. An abnormality diagnosis system, comprising:
an exhaust purification catalyst provided in an exhaust passage of an internal combustion engine;
an upstream air-fuel ratio sensor provided in the exhaust passage at an upstream side of the exhaust purification catalyst in a direction of flow of exhaust gas;
a downstream air-fuel ratio sensor provided in the exhaust passage at a downstream side of the exhaust purification catalyst in the direction of flow of the exhaust gas; and
a diagnosis device configured to repeatedly diagnose the downstream air-fuel ratio sensor for abnormality based on output values of the upstream and downstream air-fuel ratio sensors, wherein when the output value of the upstream air-fuel ratio sensor indicates a rich air-fuel ratio richer than a stoichiometric air-fuel ratio at a first time, the diagnosis device is configured to continuously monitor the output value of the downstream air-fuel ratio sensor, such that when the diagnosis device detects a change of the output value of the downstream air-fuel ratio sensor from a first output value indicating an air-fuel ratio richer than a lean judged reference air-fuel ratio that is leaner than the stoichiometric air-fuel ratio to a second output value indicating an air-fuel ratio leaner than the lean judged reference air-fuel ratio at a second time, the diagnosis device determines that the downstream air-fuel ratio sensor has an abnormality and generates, at the second time, a signal indicating the abnormality of the downstream air-fuel ratio sensor.

2. The abnormality diagnosis system according to claim 1, wherein the diagnosis device is configured to determine that the downstream air-fuel ratio sensor has an abnormality in response to the detected change of the output value of the downstream air-fuel ratio sensor, and when the output value of the upstream air-fuel ratio sensor changes from a third output value indicating an air-fuel ratio leaner than the stoichiometric air-fuel ratio to a fourth output value indicating a rich air-fuel ratio and is maintained at the fourth value.

3. The abnormality diagnosis system according to claim 1, wherein the system further comprises a flow rate detecting device configured to detect or estimate a flow rate of the exhaust gas flowing around the downstream air-fuel ratio sensor, and the diagnosis device is configured to diagnose abnormality of the downstream air-fuel ratio sensor only when the flow rate detected or estimated by the flow rate detecting device is a predetermined lower limit flow rate or more.

4. The abnormality diagnosis system according to claim 3, wherein the diagnosis device is configured to set the lean judged reference air-fuel ratio based on the flow rate of the exhaust gas detected or estimated by the flow rate detecting device.

5. The abnormality diagnosis system according to claim 4, wherein the diagnosis device is configured to set the lean judged reference air-fuel ratio leaner, the greater the flow rate of the exhaust gas detected or estimated by the flow rate detecting device.

6. The abnormality diagnosis system according to claim 1, wherein the diagnosis device is configured to set the lean judged reference air-fuel ratio based on the air-fuel ratio detected by the upstream side air-fuel ratio sensor.

7. The abnormality diagnosis system according to claim 6, wherein the diagnosis device is configured to set the lean judged reference air-fuel ratio leaner, the lower the air-fuel ratio detected by the upstream side air-fuel ratio sensor.

8. The abnormality diagnosis system according to claim 1, wherein the internal combustion engine is configured to perform fuel cut control for stopping or decreasing supply of fuel to a combustion chamber during operation of the internal combustion engine, and the diagnosis device is configured to not diagnose the downstream air-fuel ratio sensor for abnormality when an elapsed time from an end of the fuel cut control is a reference elapsed time or less.

9. The abnormality diagnosis system according to claim 1, wherein the internal combustion engine is configured to perform fuel cut control for stopping or decreasing supply of fuel to a combustion chamber during operation of the internal combustion engine, and after an end of the fuel cut control, post-reset rich control for making an air-fuel ratio of the exhaust gas flowing into the exhaust purification catalyst a rich air-fuel ratio richer than the stoichiometric air-fuel ratio, and the diagnosis device is configured to diagnose the downstream air-fuel ratio sensor for abnormality during execution of the post-reset rich control.

10. The abnormality diagnosis system according to claim 1, wherein the internal combustion engine is configured to perform normal control for alternately changing an air-fuel ratio of the exhaust gas flowing into the exhaust purification catalyst between a rich air-fuel ratio richer than the stoichiometric air-fuel ratio and a lean air-fuel ratio leaner than the stoichiometric air-fuel ratio, and active control for making the air-fuel ratio of the exhaust gas flowing into the exhaust purification catalyst richer than the rich air-fuel ratio at the time of the normal control, and the diagnosis device is configured to diagnose the downstream air-fuel ratio sensor for abnormality during execution of the active control.

11. The abnormality diagnosis system according to claim 1, wherein the downstream air-fuel ratio sensor is a cup-shaped air-fuel ratio sensor.

12. The abnormality diagnosis system according to claim 1, wherein the diagnosis device is configured to turn ON a warning light of a vehicle, on which the internal combustion engine is mounted, in response to a determination that the downstream air-fuel ratio sensor has become abnormal.

13. The abnormality diagnosis system according to claim 2, wherein the system further comprises a flow rate detecting device configured to detect or estimate a flow rate of the exhaust gas flowing around the downstream air-fuel ratio sensor, and the diagnosis device is configured to diagnose abnormality of the downstream air-fuel ratio sensor only when the flow rate detected or estimated by the flow rate detecting device is a predetermined lower limit flow rate or more.

14. The abnormality diagnosis system according to claim 13, wherein the diagnosis device is configured to set the lean judged reference air-fuel ratio based on the flow rate of the exhaust gas detected or estimated by the flow rate detecting device.

15. The abnormality diagnosis system according to claim 14, wherein the diagnosis device is configured to set the lean judged reference air-fuel ratio leaner, the greater the flow rate of the exhaust gas detected or estimated by the flow rate detecting device.

16. An abnormality diagnosis system, comprising:
an exhaust purification catalyst provided in an exhaust passage of an internal combustion engine;
an upstream air-fuel ratio sensor provided in the exhaust passage at an upstream side of the exhaust purification catalyst in a direction of flow of exhaust gas;
a downstream air-fuel ratio sensor provided in the exhaust passage at a downstream side of the exhaust purification catalyst in the direction of flow of the exhaust gas;
a flow rate detecting device configured to detect or estimate a flow rate of the exhaust gas flowing around the downstream air-fuel ratio sensor; and
a diagnosis device configured to repeatedly diagnose the downstream air-fuel ratio sensor for abnormality based on outputs of the upstream and downstream air-fuel ratio sensors, wherein
when the output air-fuel ratio of the upstream air-fuel ratio sensor is a rich air-fuel ratio richer than a stoichiometric air-fuel ratio, the diagnosis device is configured to
detect a change of the output air-fuel ratio of the downstream air-fuel ratio sensor
from an air-fuel ratio richer than a lean judged reference air-fuel ratio leaner than the stoichiometric air-fuel ratio,
to an air-fuel ratio leaner than the lean judged reference air-fuel ratio, and
in response to the detected change of the output air-fuel ratio of the downstream air-fuel ratio sensor, determine that the downstream air-fuel ratio sensor has an abnormality and generate a signal indicating the abnormality of the downstream air-fuel ratio sensor,
diagnose abnormality of the downstream air-fuel ratio sensor only when the flow rate detected or estimated by the flow rate detecting device is a predetermined lower limit flow rate or more, and
set the lean judged reference air-fuel ratio based on the flow rate of the exhaust gas detected or estimated by the flow rate detecting device.

17. An abnormality diagnosis system, comprising:
an exhaust purification catalyst provided in an exhaust passage of an internal combustion engine;
an upstream air-fuel ratio sensor provided in the exhaust passage at an upstream side of the exhaust purification catalyst in a direction of flow of exhaust gas;
a downstream air-fuel ratio sensor provided in the exhaust passage at a downstream side of the exhaust purification catalyst in the direction of flow of the exhaust gas; and
a diagnosis device configured to repeatedly diagnose the downstream air-fuel ratio sensor for abnormality based on outputs of the upstream and downstream air-fuel ratio sensors, wherein
when the output air-fuel ratio of the upstream air-fuel ratio sensor is a rich air-fuel ratio richer than a stoichiometric air-fuel ratio, the diagnosis device is configured to
detect a change of the output air-fuel ratio of the downstream air-fuel ratio sensor
from an air-fuel ratio richer than a lean judged reference air-fuel ratio leaner than the stoichiometric air-fuel ratio,
to an air-fuel ratio leaner than the lean judged reference air-fuel ratio, and
in response to the detected change of the output air-fuel ratio of the downstream air-fuel ratio sensor, determine that the downstream air-fuel ratio sensor has an abnormality and generate a signal indicating the abnormality of the downstream air-fuel ratio sensor, and
set the lean judged reference air-fuel ratio based on the air-fuel ratio detected by the upstream side air-fuel ratio sensor.

* * * * *